April 25, 1933.  V. C. NORQUIST ET AL  1,905,738
FILTER
Filed June 6, 1930
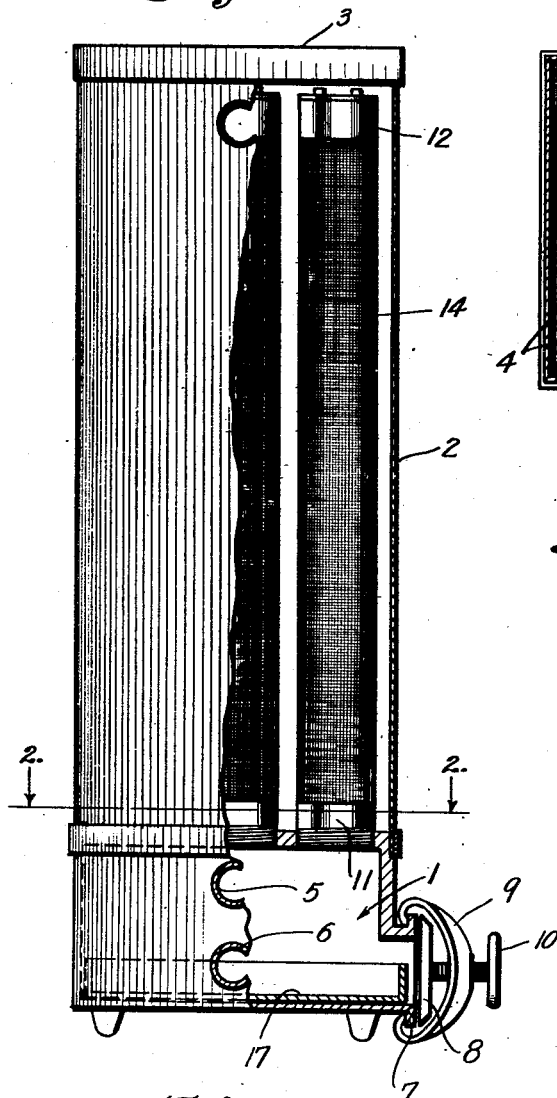
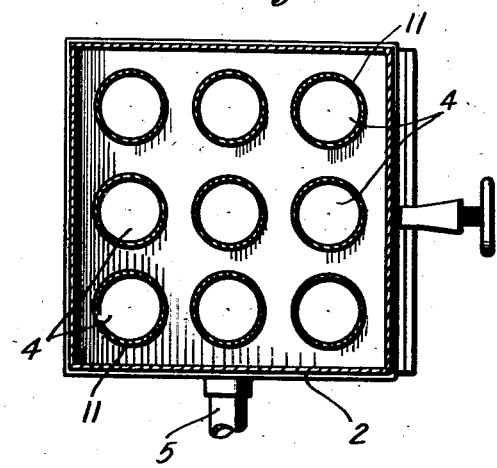
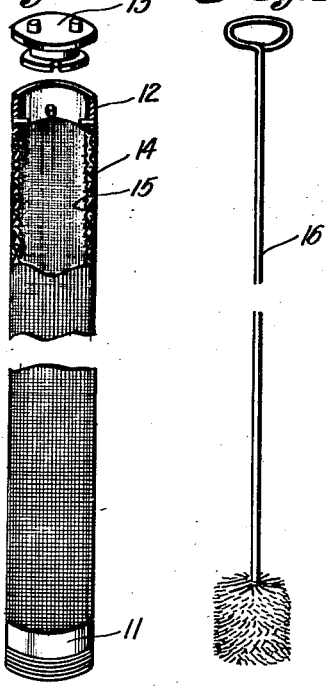
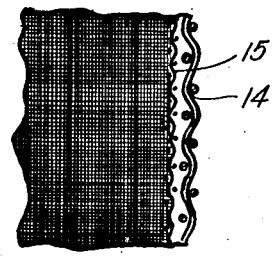
INVENTOR.
Victor C. Norquist
and Earl E. Treanor
BY
Thos. E. Scofield
ATTORNEY.

Patented Apr. 25, 1933

1,905,738

UNITED STATES PATENT OFFICE

VICTOR C. NORQUIST AND EARL E. TREANOR, OF KANSAS CITY, MISSOURI, ASSIGNORS TO BUTLER MANUFACTURING COMPANY, OF KANSAS CITY, MISSOURI, A CORPORATION OF MISSOURI

FILTER

Application filed June 6, 1930. Serial No. 459,577.

This invention relates to improvements in filters, and refers more particularly to filters adapted to be used for the purification of dry cleaning solvents.

Among the salient objects of the invention are, to provide a filter which is easily manufactured at lower cost, one which has an increased filtering surface over filters of the same size, and a filter which may be easily cleaned.

Fig. 1 is an elevation view of the filter with the casing broken away to show the filtering tubes.

Fig. 2 is a view taken along the lines 2—2 in Fig. 1.

Fig. 3 is a detailed view of one of the filter tubes.

Fig. 4 shows the cleaning brush.

Fig. 5 is an enlarged detail of the filtering screen.

Referring to the drawing, the filter consists of a lower compartment 1, above which is mounted the filter casing 2. This casing is surmounted by a removable top 3. In the top of the lower compartment 1 are a plurality of threaded holes 4. In the side of the compartment is an inlet pipe 5 and a drain pipe 6. Near the bottom of the compartment is a flanged port 7, to which is fitted a closure or clean out plate 8, held in place by means of a yoke 9 and screw 10. The filter tubes consist of lower solid parts 11, which are threaded to fit into the holes 4 in the bottom compartment of the filter, and upper solid parts 12, which are fitted with caps 13. These caps are removable and preferably have a spanner wrench connection with the upper parts 12 of the tubes so that they can be easily removed.

Between the upper and lower solid parts 11 and 12 are reinforcement heavy mesh wire screen tubes 14, within which are fine mesh wire tubes 15. The outer reinforcement heavy mesh screen serves primarily as a support for the inner fine mesh filter screen.

In operation the dirty solvent containing solids to be removed is introduced from the washer or cleaning equipment through the pipe 5 into the lower compartment. This compartment fills up and the liquid rises into the filter tubes. The liquid solvent passes through the tubes leaving the dirt and filter aid, such as silica or other material, deposited upon the inner screen of the tubes.

When the filter cake has been built up on the screen of the tubes to the extent that inefficiency of the filter results, the filter is cut out of the system and the liquid drained from the filter through the pipe 6. The top 3 is then removed from the filter and the caps 13 removed from the separate tubes. The flue or cleaning brush 16 is then run through the individual tubes, forcing the filter cake and dirt out through the bottom of the tubes into the dirt tray or pan 17, positioned in the bottom of the compartment 1. By removing the clean-out plate 8, this pan can be taken out of the compartment and the filter cake and dirt emptied. The pan is then returned to the compartment, the clean-out plate replaced and the caps on the tubes and the tops of the filter put in place, after which time the filter is again ready to be cut into the system.

The simplicity of the device and the surface offered in a compact arrangement as shown, as well as the facility of cleaning provides a design which is efficient in the purification of cleaning solvent.

We claim as our invention:

1. A filter comprising in combination a casing, a partition dividing said casing into upper and lower chambers, a plurality of apertures in said partition, tubular filter screens mounted in said apertures, a sludge pan removably positioned in said lower chamber, a handhole in said lower chamber permitting the removal of said sludge pan, a cover plate for said handhole, an inlet for introducing the liquid to be filtered into said lower chamber, an outlet for the filtered liquid from said upper chamber, said upper chamber provided with a removable cover, and said filter screens provided with removable caps whereby said cover and said caps may be removed to permit the filter screens to be cleaned expeditiously.

2. A filter comprising in combination a casing, a partition dividing said casing into upper and lower chambers, a plurality of apertures in said partition, tubular filter screens mounted in said apertures, a handhole in said lower chamber permitting the removal of sludge, a cover plate for said handhole, an inlet for introducing the liquid to be filtered into said lower chamber, an outlet for the filtered liquid from said upper chamber, said upper chamber provided with a removable cover, and said filter screens provided with removable caps whereby said cover and said caps may be removed to permit the filter screens to be cleaned expeditiously.

In testimony whereof we affix our signatures.

VICTOR C. NORQUIST.
EARL E. TREANOR.